United States Patent
Hvidtfeldt et al.

[15] 3,678,345
[45] July 18, 1972

[54] CAPACITOR IMPREGNATED WITH ELECTROLYTE AND OIL CONTAINING DEPOLARIZER

[72] Inventors: Niels Hvidtfeldt, Snebaervaenget; Adam Ruttkay, Drosselvej, both of Denmark

[73] Assignee: Wicon Kondenstorfabrik A/S, Copenhagen, Denmark

[22] Filed: Jan. 22, 1971

[21] Appl. No.: 108,925

[30] Foreign Application Priority Data

Jan. 23, 1970 Great Britain..................3,462/70

[52] U.S. Cl. ..............................317/230, 29/570
[51] Int. Cl. .......................................H01g 9/00
[58] Field of Search....................317/230, 231, 233

[56] References Cited

UNITED STATES PATENTS

| 923,774 | 6/1909 | Creighton | 317/230 |
| 987,622 | 3/1911 | Goodwin | 317/230 |
| 1,992,545 | 2/1935 | Robinson | 317/230 |
| 3,307,085 | 2/1967 | Ross | 317/230 |
| 3,321,676 | 5/1967 | Ross | 317/230 |
| 3,333,165 | 7/1967 | Broadbent | 317/230 |

*Primary Examiner*—James D. Kallam
*Attorney*—Watson, Cole, Grindle & Watson

[57] ABSTRACT

An electrolytic capacitor comprises a capacitance element consisting of a convolutely wound metal and spacer strip assembly, which is impregnated with an electrolyte and additionally impregnated with oil which also completely fills a metal can in which the capacitance element is enclosed.

4 Claims, 1 Drawing Figure

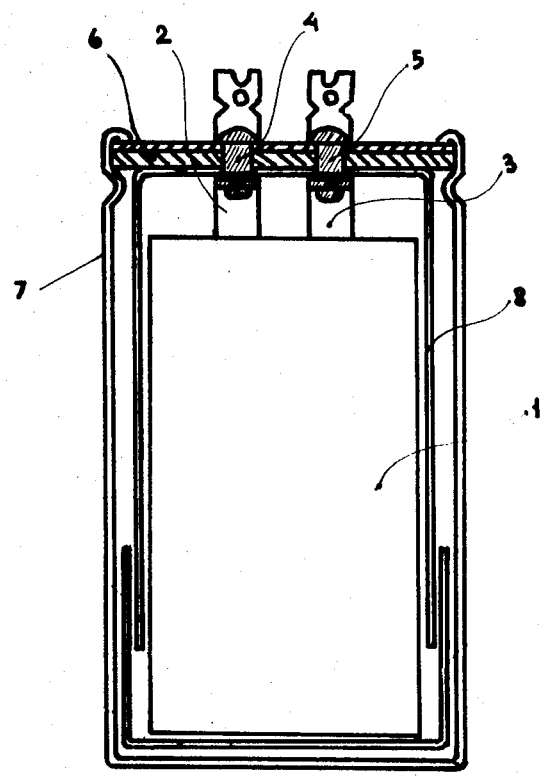

CAPACITOR IMPREGNATED WITH ELECTROLYTE AND OIL CONTAINING DEPOLARIZER

BACKGROUND OF THE INVENTION

This invention relates to improvements in electrolytic capacitors and the manner of their production.

Electrolytic capacitors usually comprise a strip of metal foil, mostly aluminum, which is convolutely wound together with a spacer such as a strip of porous paper impregnated with an electrolyte, the metal foil serving as the anode and being provided on its surface with a dielectric barrier layer formed by a so-called forming or anodizing process, the electrolyte serving as the cathode of the capacitor. The capacitor may also comprise a pick-up strip of non-formed metal foil wound together with the anode strip and the spacer and serving to establish the electric connection between the electrolyte and one of the outer terminals of the capacitor. In the case of bipolar or reversible electric capacitors two anode strips are used in combination with a common electrolyte-filled spacer. In some electrolytic capacitors a solid semi-conducting material is used instead of the electrolyte-filled spacer.

SUMMARY OF THE INVENTION

According to the invention, a convolutely wound assembly forming a capacitance section is additionally impregnated with oil or another electrically insulating material, which is not capable of solving components of the electrolyte. It has been found that by such impregnation, several advantages may be achieved, particularly a reduction of the loss factor at higher voltages and an increase of the leakage current stability during storage. Moreover, where the capacitance section is mounted in a metal can, the arrangement can easily be made such that the convolutely wound assembly and the terminals are interiorly insulated from the surrounding metal can so that an exterior electric insulation becomes superfluous.

One method of making an electrolytic capacitor section according to the invention is as follows:

As aluminum foil is first formed up to a desired voltage and is then cut into strips of the desired width. Each such strip is wound together with a spacer strip and a pick-up strip and the convolutely wound assembly is thereafter impregnated with an electrolyte, e.g., by vacuum impregnation or centrifugal impregnation or by prolonged dipping into the electrolyte. After that a voltage higher than the intended maximum operating voltage is applied to the capacitor section for some hours to effect post-formation and to check the eventual leakage current. Then, according to the invention, follows an impregnation with oil, which again may be effected by vacuum, centrifugal action or prolonged dipping.

In experiments carried out in connection with the invention, mineral oil has been used for the added impregnation step, but it is not a condition that this impregnant should have a high electric insulation. It seems to be essential, however, that it should be incompatible with the electrolyte and should not be capable of solving components of the electrolyte or reaction products formed at the defective spots which are healed during the post-forming operation.

As an example, it has been found that bipolar A.C. capacitors with non-etched anode can be produced by known methods for constant A.C. loads up to 130 V, but only when using anode material formed up to 600 V.

When adding the oil impregnating step according to the invention, equal results may be obtained using anode material formed up to 400 V whereby a considerable saving of material and a considerable reduction of the mechanical dimensions of the capacitor are obtained. At the same time the loss factor as measured at 130 V, 50 cycles is reduced by about 40 percent.

At low voltages, such as 1 V, no reduction of the loss factor has been ascertained. This seems to indicate that in the known capacitors a loss occurs by the passage of current in phase with the voltage when the peak value of the latter exeeds a certain threshold value, at which the defective spots apparently begin to conduct, which mechanism is prevented by the added impregnation step according to the invention.

While hydrogen may to some extent be solved in the insulating impregnant and escape through a diaphragm by diffusion, it is desireable altogether or practically to avoid the development of hydrogen in the capacitor, seeing that even small quantities of hydrogen in an oil filled can will create high pressures that may give rise to leakage.

The formation of hydrogen may be avoided practically completely by adding a depolarizing substance to the electrolyte with which the spacer is impregnated. By a depolarizing substance is to be understood an additive reacting with hydrogen formed at the cathode. Suitable additives are nitro compounds. Good results have been obtained by using m-nitro benzoeacid as a depolarizing substance in the electrolyte.

The greatest number of deficiencies of the barrier layer occur along the cut edges of the anode foil which are present in the end faces of the convolutely wound assembly. There is therefore a risk that the depolarizing substance of the electrolyte is locally consumed so that hydrogen will after some time be liberated, though in small quantities. This may be prevented by adding a depolarizing substance to the insulating impregnant. There will then always be depolarizing substance available at the end faces of the convolutely wound assembly because the dissolved depolarizing substance can spread through the impregnant by diffusion.

The depolarizing substance added to the insulating impregnant should be different from that added to the electrolyte. It is possible to use esters either containing reactive double bonds such as dibutyl-maleinate or a nitro compound such as p-nitro-benzoeacid-ethylester. It is observed that this, like the nitro compound proposed as depolarizing substance for the electrolyte, is non poisonous and non-explosive.

The can of the capacitor may be constructed with a safety valve operating at high pressure as a consequence of thermal or electrical overload, but it is not necessary to take measures to facilitate the diffusion of hydrogen, because even with a completely sealed can there is no danger of explosion, because there is no air space in which energy can be accumulated by compression. Any oil pressed out of the can is relatively harmless to the surroundings.

If it is desirable that both of the poles of the capacitor are insulated from the metal can, the impregnated convolutely wound assembly can be surrounded by plastics container e.g. consisting of polyethylene or polyvinyl alcohol. Such a container will prevent the electrolyte from spreading and forming a conducting bridge between the negative pole and the can.

BRIEF DESCRIPTION OF THE DRAWING

The FIGURE shows a section through a capacitor according to one embodiment of the invention.

DESCRIPTION OF THE PREFERRED EMBODIMENT.

In the drawing, 1 is a capacitance element in the form of a convolutely wound assembly of the type described above comprising a strip of formed aluminum, a spacer strip, and a further strip of aluminum which in the case of bipolar capacitors is likewise formed. 2 and 3 are tabs extending from the two strips which are connected to rivets 4 and 5 extending through an insulating cover 6 of an aluminum can 7, in which the capacitor is enclosed. 8 is a two-part plastics container surrounding the convolutely wound assembly and thus located between the latter and the aluminum can 7. The whole of the space inside the aluminum can is filled with the oil, with which the convolutely wound assembly is impregnated. This filling with oil may be obtained by performing the oil impregnating step after the convolutely wound assembly has been mounted in the can, but before the wall of the can has been sealed around the edge of the cover.

The spacer of the convolutely wound assembly 1 is impregnated in known manner with an electrolyte. As an example, an electrolyte that may be used for bipolar A.C. capacitors with electrodes of smooth aluminum foil at a voltage of 150 V m.r.s., 50 Hz may be made up as follows:

50 kgs boric acid and 40 liters ethylene glycol are mixed and boiled until the temperature has reached 135°C. 40 liters glycerine, specific gravity 1.26, 8 kgs m-nitro-benzoeacid and 6 liters 25 percent ammonia water are added under constant stirring. The mixture is heated to boiling temperature. An example of an insulating impregnating material is transformer oil with an addition of 5 percent by weight of p-nitro-benzoeacid-ethylester.

An additional advantage of the oil filling is that it prevents corrosion of the connections between the capacitor electrodes and the terminals. One consequence of this is that the connecting tabs may be connected to the rivets extending through the cover by spot welding without involving any risk of corrosion. Such risk exists in known electrolytic capacitors because traces of foreign metals from the electrodes are deposited on the aluminum parts, whereby a galvanic effect is produced in combination with atmospheric air and electrolyte.

The oil also protects the well known vulnerable zones of the capacitor structure where the tab connections extend out of the convolutely wound assembly. Normally there exists in these zones an increased tendency towards arcing between the aluminum and the electrolyte because the barrier layer on the flexible tab is mechanically damaged, but this phenomenon does not occur in the oil filled capacitor according to the invention. The oil may be highly viscous, e.g., in the form of petroleum jelly or mineral wax. In this case the tab connections will be even more securely protected against moistening by the electrolyte and thereby against corrosion. It may even be possible in the case of small mass produced capacitors to weld the tab connections directly to the terminals which may, e.g., consist of tinned brass or copper.

We claim:

1. A capacitor comprising a convolutely wound assembly of at least one strip of metal foil and a porous spacer strip impregnated with an electrolyte containing a depolarizing substance, the assembly being additionally impregnated with an insulating oil which is not capable of solving components of the electrolyte and which contains a depolarizing substance different from that contained in said electrolyte.

2. A capacitor as in claim 1, in which the depolarizing substance contained in said insulating oil is p-nitro-benzoeacid-ethylester.

3. A method of manufacturing an electrolytic capacitor comprising the steps of winding at least one strip of preformed metal and a porous spacer strip to produce a convolutely wound assembly, impregnating said assembly with an electrolyte containing a depolarizing substance, applying a voltage higher than the intended maximum operating voltage between said metal strip and said electrolyte to post-form said metal strip, and impregnating said assembly with an insulating oil which is not capable of solving components of said electrolyte and which contains a depolarizing substance different from that contained in said electrolyte.

4. A method as in claim 3, in which the depolarizing substance contained in said insulating oil is p-nitro-benzoeacid-ethylester.

* * * * *